United States Patent
Cha et al.

(10) Patent No.: US 7,033,063 B2
(45) Date of Patent: Apr. 25, 2006

(54) LIQUID CRYSTAL DISPLAY DEVICE HAVING A CONTAINER MODULE WITH A NOVEL STRUCTURE

(75) Inventors: Guy-Ho Cha, Suwon-si (KR); Hee-Chun Lee, Suwon-si (KR); Jong-Dae Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/999,916

(22) Filed: Dec. 1, 2004

(65) Prior Publication Data

US 2005/0122740 A1 Jun. 9, 2005

Related U.S. Application Data

(63) Continuation of application No. 09/838,384, filed on Apr. 20, 2001, now Pat. No. 6,867,827.

(30) Foreign Application Priority Data

Apr. 28, 2000 (KR) ................. 2000-22714

(51) Int. Cl.
*F21V 7/04* (2006.01)
(52) U.S. Cl. ................. 362/632; 362/26; 362/634; 349/58; 349/65
(58) Field of Classification Search ............ 362/26, 362/632, 633, 634; 349/58, 61, 65
See application file for complete search history.

(56) References Cited

U.S. PATENT DOCUMENTS

| 5,654,779 A | 8/1997 | Nakayama et al. ........... 349/58 |
| 5,659,376 A | 8/1997 | Uehara et al. ................ 349/58 |
| 5,815,227 A | 9/1998 | Lee .............................. 349/67 |
| 5,818,555 A | 10/1998 | Yokoyama et al. ........... 349/67 |
| 6,016,175 A | 1/2000 | Kim ............................. 349/58 |
| 6,175,396 B1 | 1/2001 | Kim et al. .................... 349/58 |
| 6,292,239 B1 | 9/2001 | Nagamura et al. ........... 349/58 |
| 6,309,081 B1 | 10/2001 | Furihata ...................... 362/31 |
| 6,867,827 B1* | 3/2005 | Cha et al. .................... 362/633 |

FOREIGN PATENT DOCUMENTS

JP 11-133401 11/1999

* cited by examiner

*Primary Examiner*—Stephen F Husar

(57) ABSTRACT

A liquid crystal display has a mold frame divided into several parts. The liquid crystal display device includes a display unit for displaying an image, a back light assembly having a light source for generating a light, a light guiding plate for guiding the light, and a light focusing portion for focusing the light, and a mold frame divided into a first frame and a second frame. The mold frame receives the display unit and the back light assembly. The first frame receives the light guiding plate and the light focusing portion and the second frame receives the light source. A reflection sheet is integrally formed at an inner surface of the second frame so as to perform the function of a lamp reflector. Accordingly, a lamp cover is not required so that the number of parts and the manufacturing cost are reduced. A lamp can be exchanged by simply separating the second frame from the mold frame, so the fault of the light source caused by the friction with other elements is reduced when exchanging the lamp.

3 Claims, 9 Drawing Sheets

LIQUID CRYSTAL DISPLAY DEVICE HAVING A CONTAINER MODULE WITH A NOVEL STRUCTURE

CROSS REFERENCE TO PRIOR APPLICATION

This application is a Continuation Application from U.S. patent application Ser. No. 09/838,384, filed Apr. 20, 2001 now U.S. Pat. No. 6,867,827, which claims priority to and the benefit of Korean Patent Application No. 2000-22714, filed on Apr. 28, 2000, which are all hereby incorporated by reference for all purposes as if fully set forth herein.

BACKGROUND OF THE INVENTION

1. Field of the Invention

The present invention relates to a liquid crystal display device, more particularly, to a liquid crystal display device having a container module with a novel structure, in which a mold frame having a light source therein can be divided into several parts and a lamp reflector function is added to the mold frame, thereby reducing the number of parts and facilitating the assembling and repairing work of a lamp.

2. Description of the Related Arts

A cathode ray tube is generally used as a monitor in a television set, a measuring instrument and an information appliance. Since the cathode ray tube has a relatively heavy weight and a large size, the cathode ray tube does not match with the trend of the miniaturization and light weight requirements of the electronic appliance.

In order to solve the above problem, a liquid crystal display device, which displays information by using the electrical and optical features of a liquid crystal filled in a liquid crystal panel, is developed. The liquid crystal display device not only can meet the miniaturization and light weight requirements of the electronic appliance, but also can reduce the electric power. Recently, the liquid crystal display device is used in a flat display panel device.

The liquid crystal of the liquid crystal display device filled between a TFT (thin film transistor) substrate and a color filter substrate is a light receiving material which displays information in a screen by adjusting the amount of light incident from an exterior, so the liquid crystal display device requires a separate light source, such as a back light assembly for providing the liquid crystal panel with light.

FIG. 1 shows a conventional liquid crystal display device equipped with the back light assembly.

Referring to FIG. 1, the liquid crystal display device comprises a display unit 10, the back light assembly 20 and a chassis 30.

The display unit 10 includes a TFT substrate (not shown), a color filter substrate (not shown) and a liquid crystal (not shown) filled between the TFT substrate and the color filter substrate. An image signal is applied to a transistor of the TFT substrate through a source and a gate of the TFT substrate. At this time, the liquid crystal receives an electric signal and adjusts the amount of the light supplied from the back light assembly so as to display the image in a screen.

The back light assembly 20 is provided below the display unit 10 for uniformly supplying the light to the display unit 10.

The back light assembly 20 includes a light guiding plate 21 for guiding the light, a light source 25 which is installed at a side of the light guiding plate 21 so as to radiate the light, a reflection plate 26 which is installed at a lower side of the light guiding plate 21 so as to reflect the light radiated from the light source 25 and optical sheets 27 which is installed on an upper portion of the light guiding plate 21 so as to diffuse and collect the light transferred from the light guide plate 21.

The light source 25 includes a lamp 22 for supplying the light, a pair of lamp holders 23 which are inserted into both ends of the lamp 22 in order to protect the lamp 22, a lamp cover 24 which surrounds the lamp 22 and reflects the light radiated from the lamp 22 towards the light guiding plate 21 in order to improve the light efficiency, and a wire (not shown) for electrically connecting the lamp 22. The lamp cover 24 is made of a metal, such as brass. An inner portion of the lamp cover 24 is coated with silver (Ag) for reflecting the light.

A mold frame 30 fixedly supports the display unit 10 and the back light assembly 20.

The mold frame 30 has a hexagonal box shape and an upper portion thereof is opened. The mold frame 30 is formed at an inner portion thereof with a receiving space. A stepped jaw portion is continuously formed from an upper portion of the receiving space to a lower portion of the receiving portion. Accordingly, a peripheral portion of the light guiding plate 21 and the light source 25, which are positioned in the receiving space, are supported by a lateral portion of the mold frame 30, and the optical sheets 27 and the display unit 10 are sequentially received into the stepped jaw portion formed at the upper portion of the mold frame 30.

However, in the conventional liquid crystal display device, the mold frame 30 and the lamp cover 24 are separately manufactured due to the functional difference between them, though they correspondingly make contact with each other. This increases the numbers of parts.

In addition, since the light source 25 is slidably inserted into the mold frame 30, the assembling work is very difficult. Furthermore, the light source 25 can be damaged by contacting other parts when the light source 25 is inserted into or separated from the mold frame 30 for exchanging the lamp.

SUMMARY OF THE INVENTION

The present invention has been made to solve the problem of the prior art, and accordingly, it is a first object of the present invention to provide a liquid crystal display device in which a mold frame can be divided into several parts and a lamp reflector function is added to the mold frame.

A second object of the present invention is to provide a container module divided into several sections. Some of the divided sections can function as a lamp reflector.

To accomplish the first object of the present invention, there is provided a liquid crystal display device including a display unit for displaying an image, a back light assembly having a light source for generating a light, a light guiding plate for guiding the light, and a light focusing portion for focusing the light, and a mold frame divided into a first frame and a second frame. The mold frame receives the display unit and the back light assembly. The first frame receives the light guiding plate and the light focusing portion and the second frame receives the light source. A reflection sheet is integrally formed at an inner surface of the second frame so as to function as a lamp reflector.

To accomplish the second object of the present invention, there is provided a container module comprising a first frame for receiving a display unit that displays an image and a second frame for receiving a light source that supplies a light to the display unit. The first frame includes a bottom surface, side walls vertically formed at peripheral portions of the bottom surface except for one peripheral portion of the bottom surface, and a supporting member for supporting the second frame. The second frame is detachably coupled to the supporting member and is provided at an inner portion thereof with a lamp reflector.

According to the present invention, a lamp cover for reflecting the light radiated into a rear side of a lamp into the light guiding plate is not required, so the number of parts and the manufacturing cost of the liquid crystal display device can be reduced, improving the working efficiency. In addition, the lamp can be exchanged by simply separating the second frame, so the light source can be protected from damage when exchanging the lamp.

BRIEF DESCRIPTION OF THE DRAWINGS

The above objects and other advantages of the present invention will become more apparent by describing in detail preferred embodiments thereof with reference to the attached drawings, in which.

DETAILED DESCRIPTION OF THE INVENTION

Hereinafter, the present invention will be described in detail with reference to the accompanying drawings. In this application, a length direction of a lamp of a liquid crystal display device is referred to a transverse direction and a vertical direction of the lamp is referred to a longitudinal direction. In addition, in the liquid crystal display device, a first portion in which a liquid crystal display panel is positioned is referred to an upper portion and a second portion in opposite to the first portion is referred to a lower portion.

Figure 1:
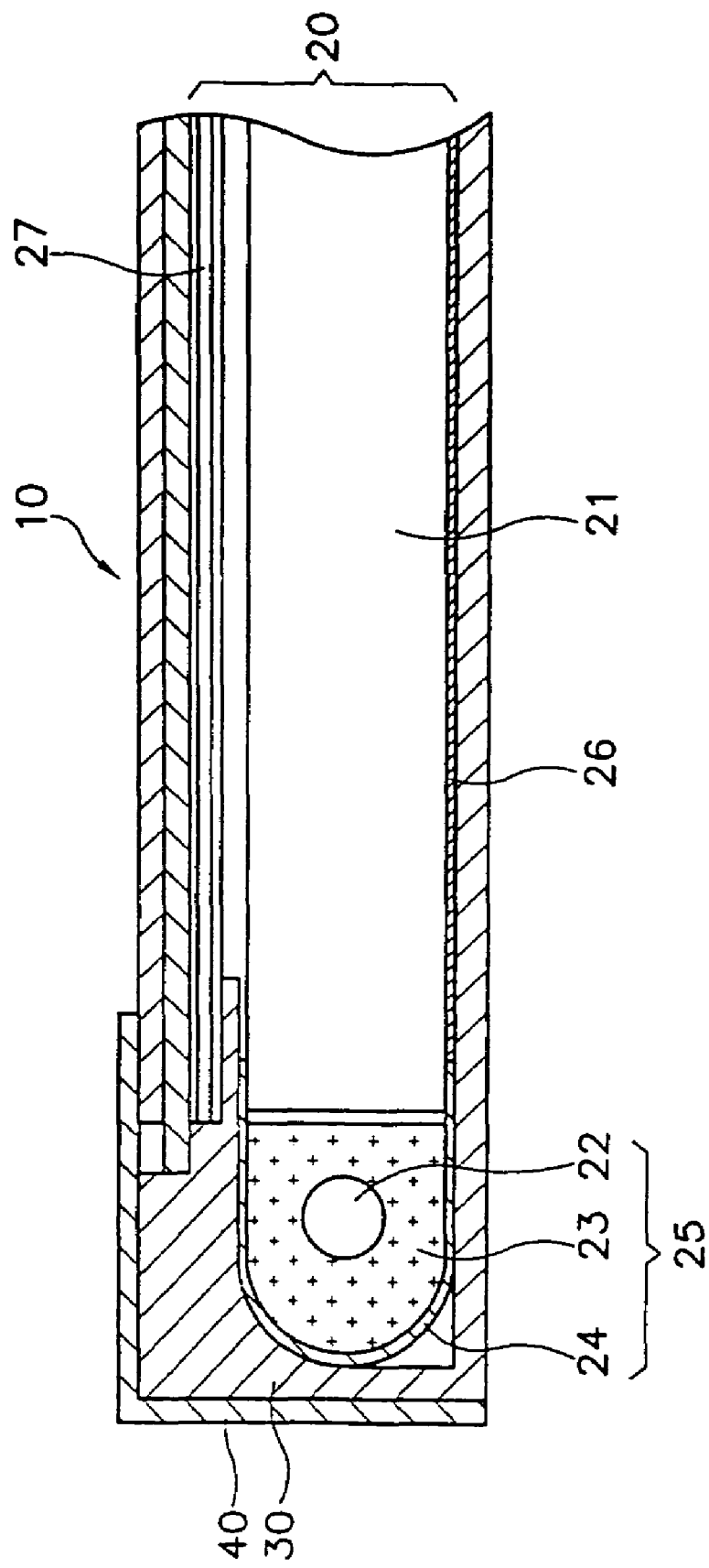
FIG. 1 is a schematic sectional view showing a conventional liquid crystal display device.
Figure 2:
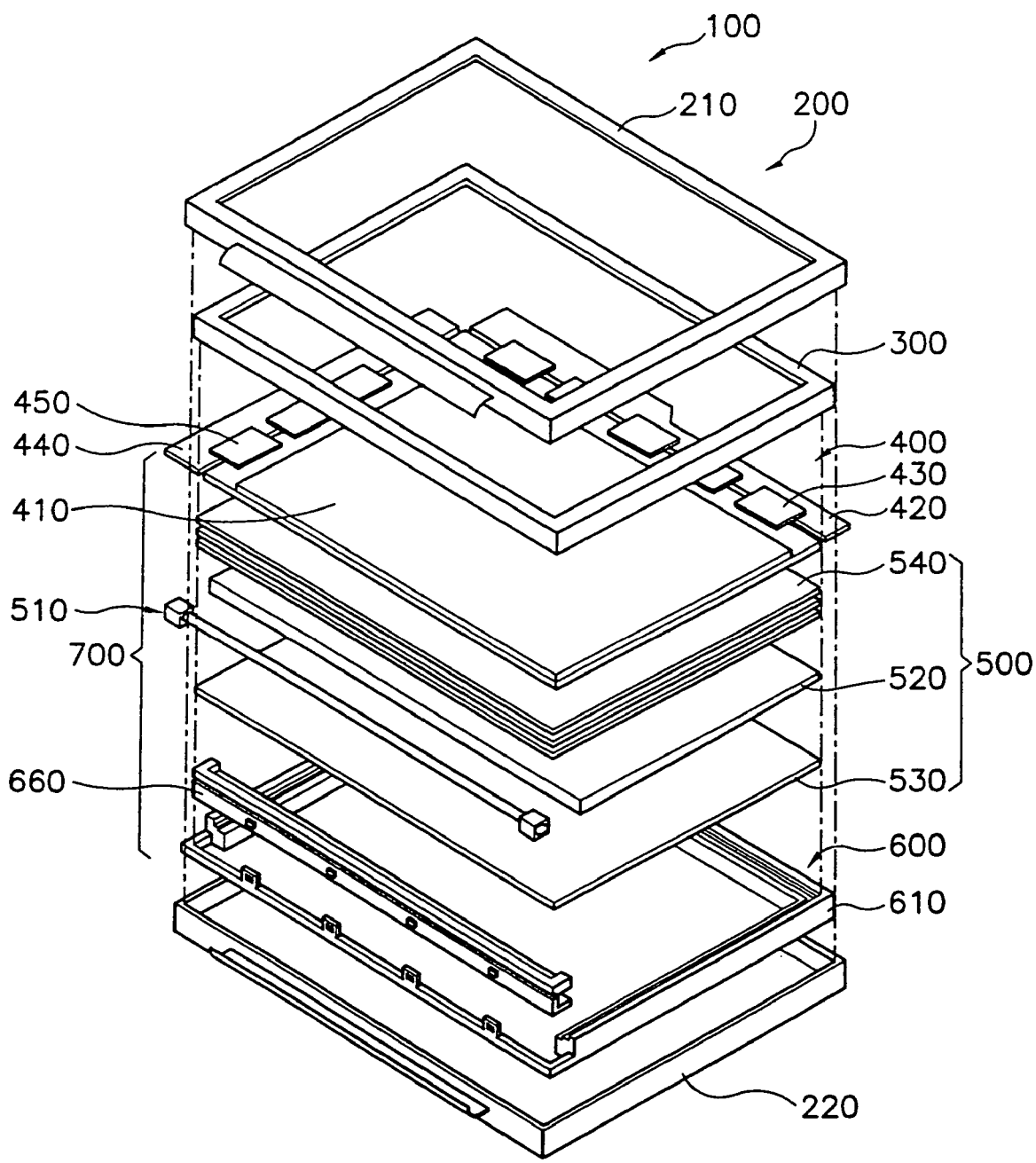
FIG. 2 is an exploded perspective view showing a liquid crystal display device according to an embodiment of the present invention.

FIG. 2 shows an exploded view of the liquid crystal display device having a mold frame that can be divided into several parts.

Referring to FIG. 2, the liquid crystal display device 100 has a liquid crystal display module 700 for displaying an image by receiving an image signal and a case part 200 for receiving the liquid crystal display module 200.

The liquid crystal display device 700 includes a display unit 400 for displaying the image, a back light assembly 500 for supplying the light, and a mold frame 600 for fixedly securing the display unit 400 and the back light assembly 500. The case part 200 includes a front case 210 and a rear case 220.

The display unit 400 includes a liquid crystal display panel 410 for displaying the image, a source side printed circuit board 420 for applying a driving signal to a data line, a source side tape carrier package 430 which determines the time for applying the data line driving signal, a gate side printed circuit board 440 for applying a driving signal to a gate line, and a gate side tape carrier package 450 that determines the time for applying the gate line driving signal. The liquid crystal display panel 410 consists of a TFT substrate positioned at a lower portion, a color filter substrate positioned at an upper portion and a liquid crystal formed between the TFT substrate and the color filter substrate.

The image signal is applied to a transistor of the TFT substrate through a source portion and a gate portion of the TFT substrate. At this time, the liquid crystal receives an electric signal and adjusts the amount of the light supplied from the back light assembly 500 thereby forming the image.

The back light assembly 500 is positioned below the display unit 400 for uniformly supplying the light to the display unit 400.

The back light assembly 500 has a light source 510, a light guiding plate 520, a reflection plate 530 and optical sheets 540.

The light source 510 includes a linear lamp 512 installed at a side of the liquid crystal display module 700 so as to generate the light, a pair of lamp holders 514 which are inserted into both ends of the lamp 512 so as to protect the lamp 512, and a wire 516 for electrically connecting the lamp 512 with an outer electrical source.

The light guiding plate 520 has a size corresponding to the size of the liquid crystal display panel 410 of the display unit 400 and is positioned below the liquid crystal display panel 410 so as to guide the light towards the display unit 400 while changing the light route. The thickness of the light guiding plate 520 gradually decreases as it goes away from the light source 510.

The reflection plate 530 is positioned below the light guiding plate 520. The reflection plate 530 reflects the light leaking from the light guiding plate 520 toward the light guiding plate 520 thereby improving the light efficiency. In addition, the plurality of optical sheets 540 are positioned above the light guiding plate 520. The optical sheets 540 makes the brightness of the light supplied into the liquid crystal display panel 410 uniform.

The display unit 400 and the back light assembly 500 are fixedly secured by the mold frame 600. The mold frame 600 has a substantially hexahedrall shape with an open upper face. One side portion of the mold frame 600, in which the light source 510 is positioned, can be assembled with and disassembled from the mold frame 600. Accordingly, the mold frame 600 consists of a first frame 610 for receiving the display unit 400 and the back light assembly 500 except for the light source 510 and a second frame 660 for receiving the light source 510. A lamp reflector is integrally formed at an inner side wall of the second frame 660 so that the number of parts can be reduced as compared with the conventional liquid crystal display device.

A chassis 300 is provided to fix printed circuit boards 420 and 440 of the display unit 400 and the tape carrier packages 430 and 450 to the mold frame 600.

The chassis 300 has the same hexahedral shape as the mold frame 600 with an opening on its upper face so as to expose the liquid crystal display panel 410. A side wall of the chassis 300 is vertically bent so as to cover an upper peripheral portion of the liquid crystal display panel 410.

The assembling of the liquid crystal display device 100 is as follows.

Firstly, the back light assembly 500 is fixed to the mold frame 600. After that, the display unit 400 is rested on the back light assembly 500. Then, printed circuit boards 420 and 440 connected through tape carrier packages 430 and 450 are bent along an outer surface of the side wall of the mold frame 600 in such a manner that the printed circuit boards 420 and 440 can be rested in the opening portion of the mold frame 600 or on the upper portion the side wall of the mold frame 600. Then, the chassis 300 is coupled to the mold frame 600 so as to fix the display unit 400 and the back light assembly 500 to the mold frame 600.

After assembling the liquid crystal display module as mentioned above, the liquid crystal display module is accommodated between the front case 210 and the rear case thereby fabricating the liquid crystal display device 100.

Figure 3:
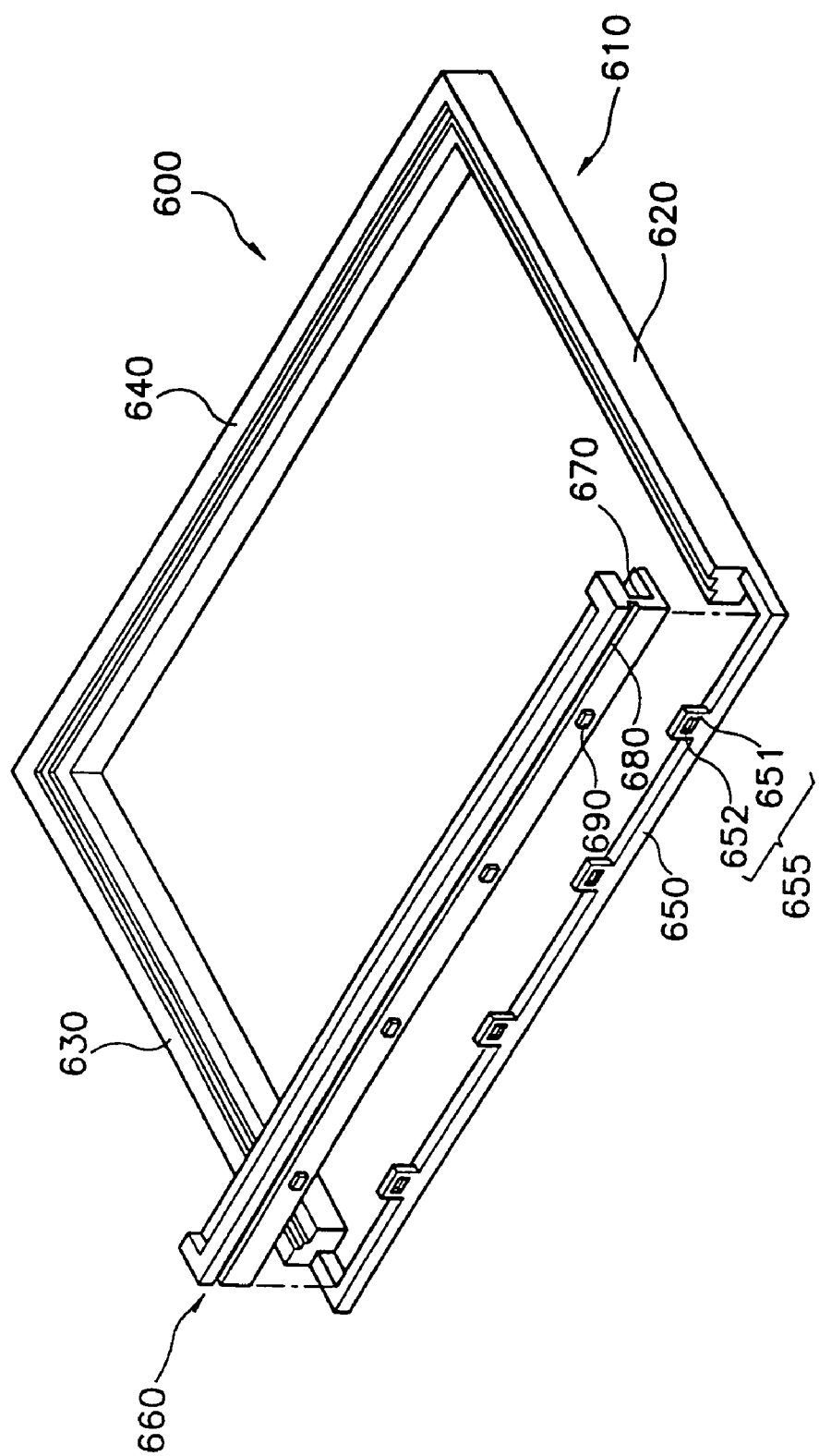
FIG. 3 is an exploded perspective view showing a mold frame according to an embodiment of the present invention.

FIG. 3 shows an exploded view of the mold frame 600 according to one embodiment of the present invention.

Referring to FIG. 3, the mold frame 600 has the first frame 610 and the second frame 660. The first frame 610 receives the display unit 400, the light guiding plate 520, the reflection plate 530 and a focusing device 540. The second frame 660 receives the light source 510 and is connected to the first frame 610.

The first frame 610 includes a bottom surface and first, second and third side walls 620, 630 and 640 that are vertically formed at side peripheral portions of the bottom surface except for one side peripheral portion of the bottom surface. In addition, a supporting member 650 for receiving the second frame 660 is formed at one side peripheral portion of the bottom surface in which the side wall is not formed. The second frame 660 is positioned at a side surface of the supporting member 650 and has an upper surface corresponding to an upper surface of the first, second and third side walls 620, 630, and 640. The second frame 660 has a length corresponding to a length of the supporting member 650, a width corresponding to an extending length of the bending portion of the supporting member 650 and a height corresponding to the first, second and third side walls 620, 630 and 640. Accordingly, the first, second and third side walls 620, 630 and 640 of the first frame 610 and the second frame 660, positioned in a space defined by the supporting member 650 and end portions of the first and second side walls 620 and 630, make a receiving space of the mold frame 600 that receives the display unit and the back light assembly.

The supporting member 650 is transversely positioned in opposite to the third side wall 640 of the first frame 610 and both ends thereof are vertically bent towards the first and second side walls 620 and 630. Accordingly, the wire for supplying the electric power to the lamp of the light source 510 received in the second frame 660 can be withdrawn to the exterior.

A first fixing part fixing and supporting the second frame 660 is integrally formed on the upper surface of the supporting member 650. Also, a second fixing portion that is detachably coupled to the first fixing portion is integrally formed on the outer surface of the second frame 660. As an embodiment of the first fixing portion, a plurality of coupling hooks 655 are integrally formed on the upper surface of the supporting member 650. Each of the coupling hooks 655 includes a fixing projection 651 which is protruded from the upper surface of the supporting member 650 and a coupling hole 652 perforating the fixing projection 651. As an embodiment of the second fixing part, a plurality of coupling projections 690 are integrally formed on the outer surface of the second frame 660. Therefore, the second frame 660 is fixed to the supporting member 650 by inserting the coupling projections 690 into the coupling holes 652, and separated from the supporting member 650 by pulling out the coupling projections 690 from the coupling holes 652. Accordingly, the second frame 660 is detachably coupled to the supporting member 650.

In addition, a plurality of supporting surfaces for supporting the focusing device 540 and the display unit 400 are formed on the upper surface of the first, second and third side walls 620, 630 and 640. The supporting surfaces have stepped shapes towards the bottom surface of the first frame 610. The upper surface of the second frame 660 has a plurality of supporting surfaces for supporting the focusing device 540 and the display unit 400. The supporting surfaces have stepped shapes towards the bottom surface of the second frame 660. Accordingly, the supporting surfaces having the stepped shapes identical to that of the first to third side walls 620, 630 and 640 are formed on the upper surface of the second frame.

A first groove 670 for receiving the lamp of the light source 510 is transversely formed on the inner surface of the second frame 660, faced with the third side wall 640, and a second groove 680 for receiving a lamp wire is formed on the outer surface of the second frame 660 symmetrical to the inner surface of the second frame 660. A plurality of coupling projections 690 corresponding to the coupling hooks 655 is integrally formed with the second frame 660 below the second groove 680. The following explains various embodiment of the second frame 660 in detail.

Figure 4:
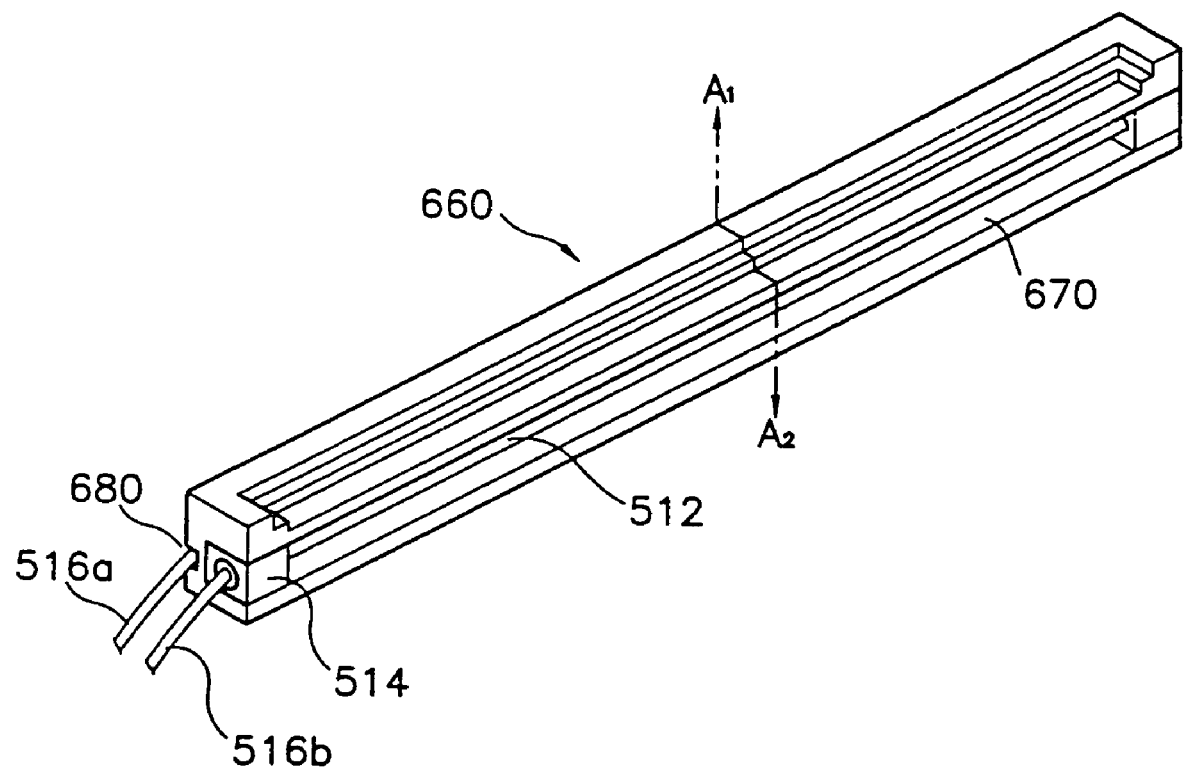
FIG. 4 is a perspective view showing the first embodiment of a second frame according to the present invention.
Figure 5:
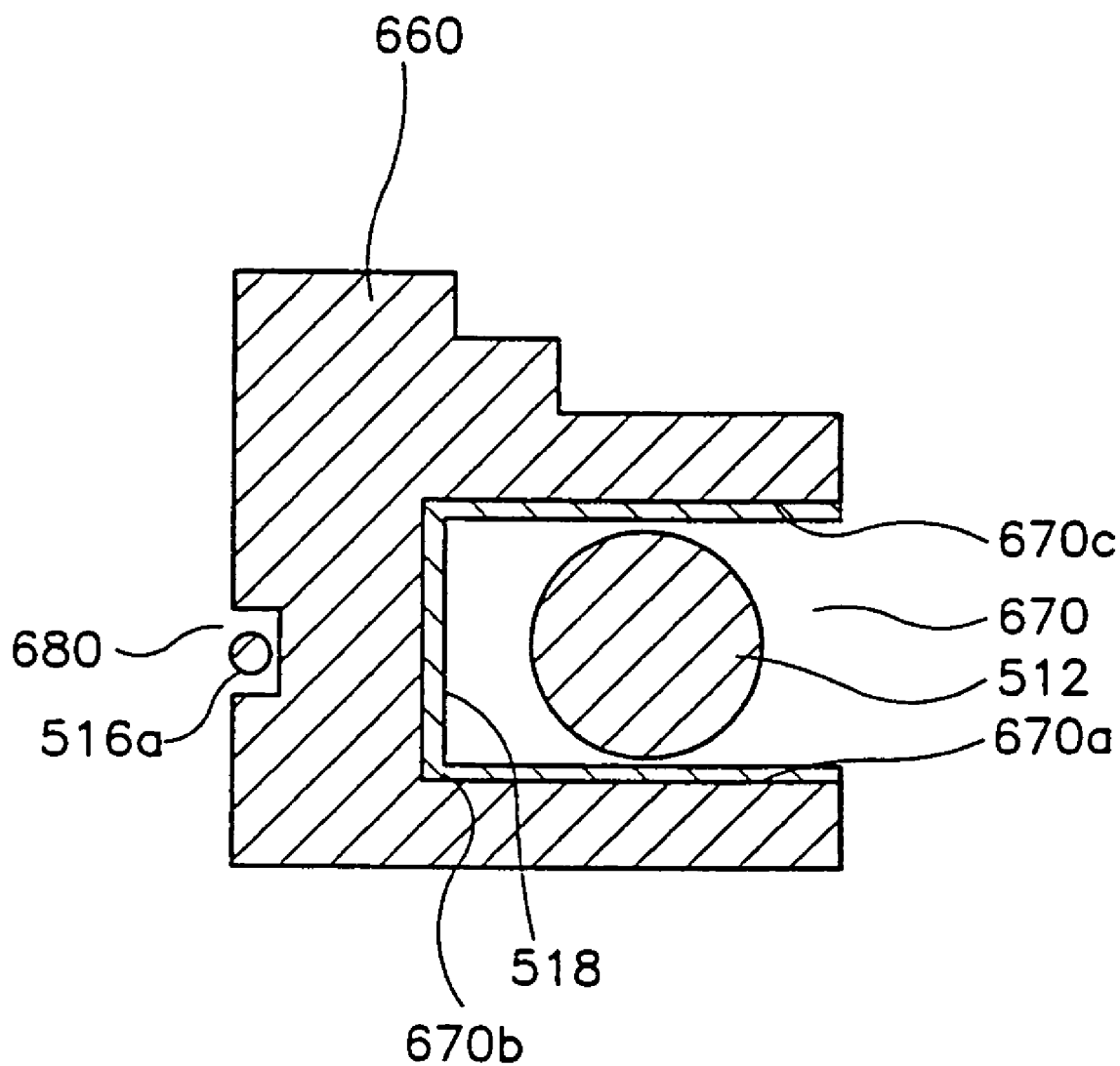
FIG. 5 is a sectional view of "$A_1$–$A_2$" portion shown in FIG. 4.

FIG. 4 shows the first embodiment of the second frame according to the present invention. FIG. 5 is a sectional view of "$A_1$–$A_2$" portion shown in FIG. 4.

Referring to FIGS. 4 and 5, the second frame 660 receiving the light source 510 has a first groove 670 receiving the lamp on a side and a second groove 680 receiving the lamp wire on the other side.

The first groove 670 has predetermined width and depth and is formed in the length direction of the second frame 660. Accordingly, the sectional shape of the first groove 670 has a substantially rectangular shape defined by a bottom portion 670*a*, a side portion 670*b* and a cover portion 670*c*. The other side portion of the first groove 670 positioned in opposite to the side portion 670*b* is open. The lamp holders 514 are positioned at both ends of the first groove 670 for supporting the lamp 512 of the light source 510. The width and depth of the first groove 670 are corresponding to the size of the lamp holder 514. The lamp 512 is positioned in the first groove 670 in the lengthwise direction of the first groove 670 and both ends of the lamp 512 are coupled the lamp holders 514.

In addition, the lamp reflector 518 for reflecting the light towards the light guiding plate 520 is integrally formed with the inner portion of the first groove 670. The lamp reflector 518 surrounds the bottom portion 670*a*, the side portion 670*b* and the cover portion 670*c* of the first groove 670 except for a portion corresponding to the lamp holder 514. Preferably, a reflecting sheet made of polyethylene terephthalate is coated on the bottom portion 670*a*, the side portion 670*b* and the cover portion 670*c* of the first groove 670.

The second groove 680 is formed on a side symmetric to the side of the second frame on which the first groove 670 is formed, shaping a square-groove which is cut out along the length of the second frame 660, having the predetermined width and depth. A connecting member 516*a* electrically connected to the lamp 512 is located inside the second groove 680.

Figure 6:
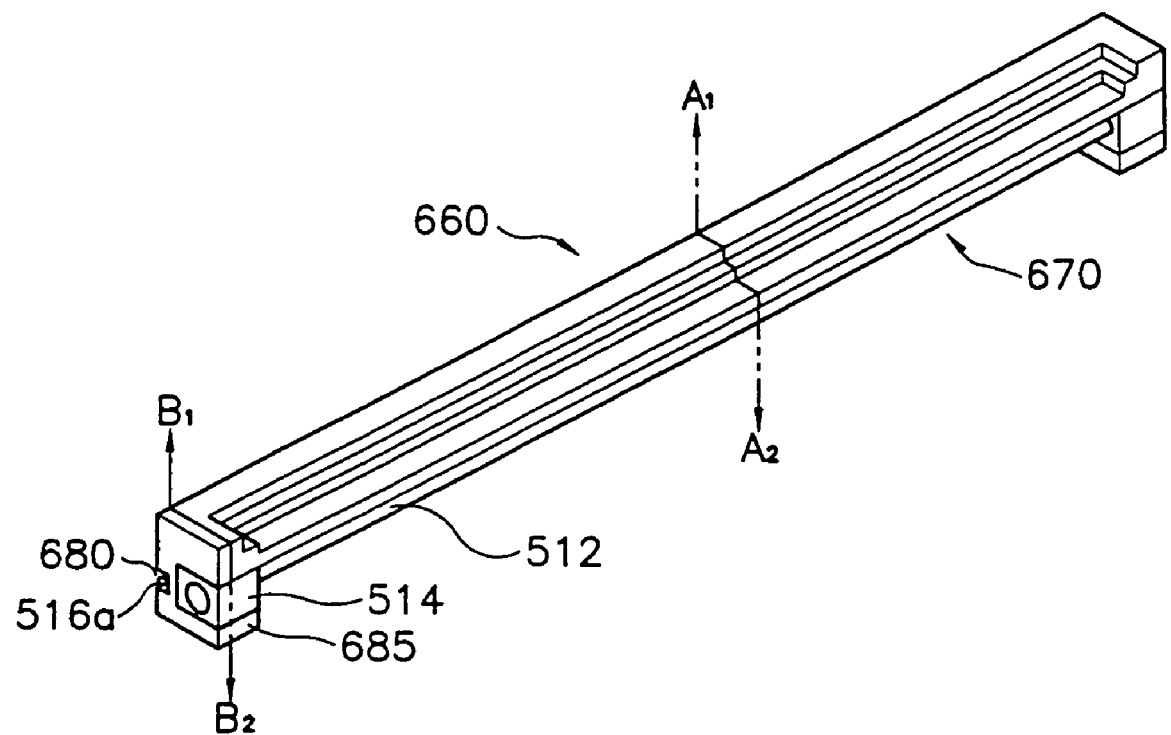
FIG. 6 is a perspective view showing the second embodiment of a second frame according to the present invention.
Figure 7:
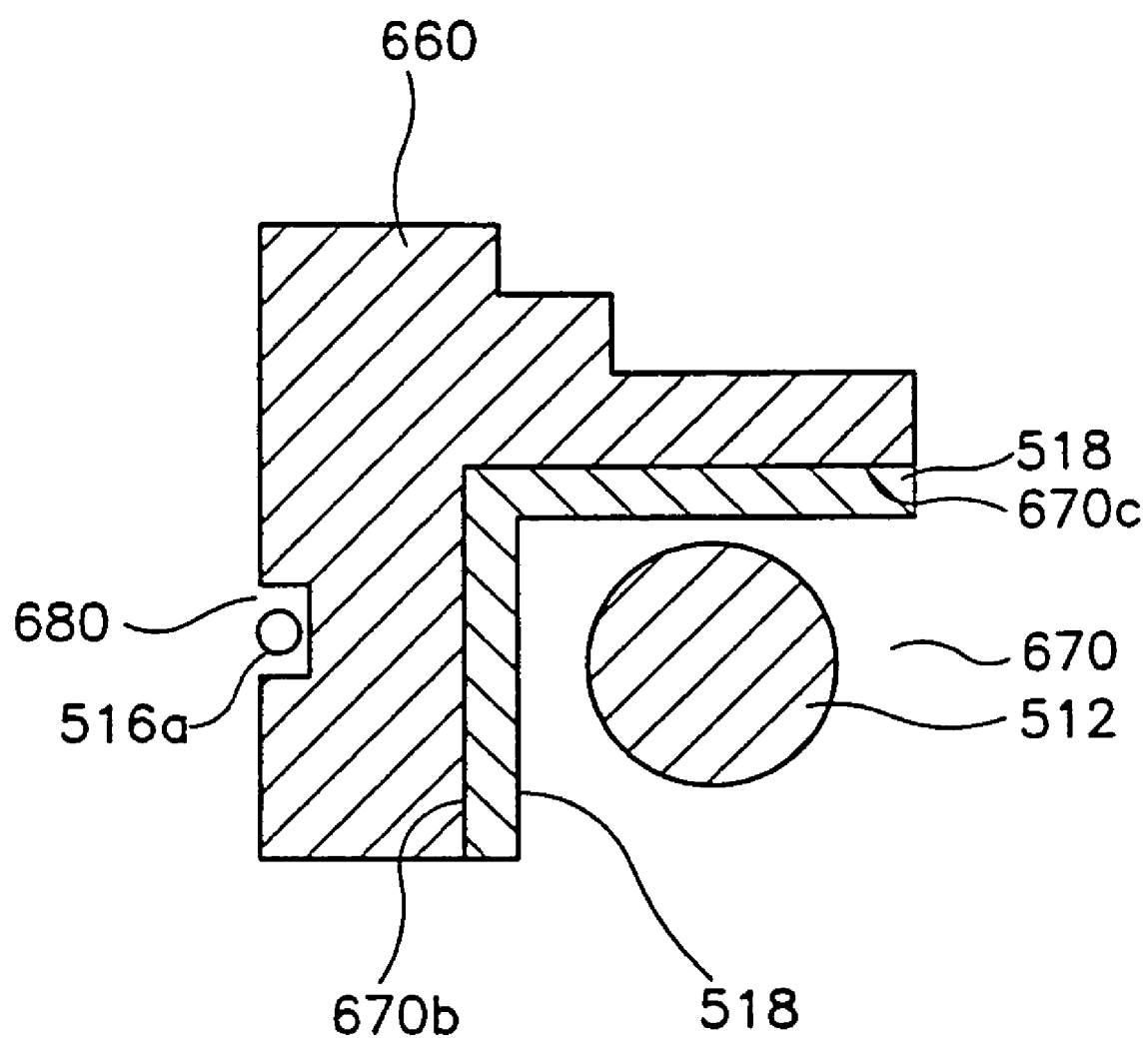
FIG. 7 is a sectional view of "$A_1$–$A_2$" portion shown in FIG. 6.

FIG. 6 shows the second embodiment of the second frame according to the present invention. FIG. 7 is a sectional view of "$A_1$–$A_2$" portion shown in FIG. 6 and FIG. 8 is a sectional view of "$B_1$–$B_2$" portion shown in FIG. 6.

Figure 8:
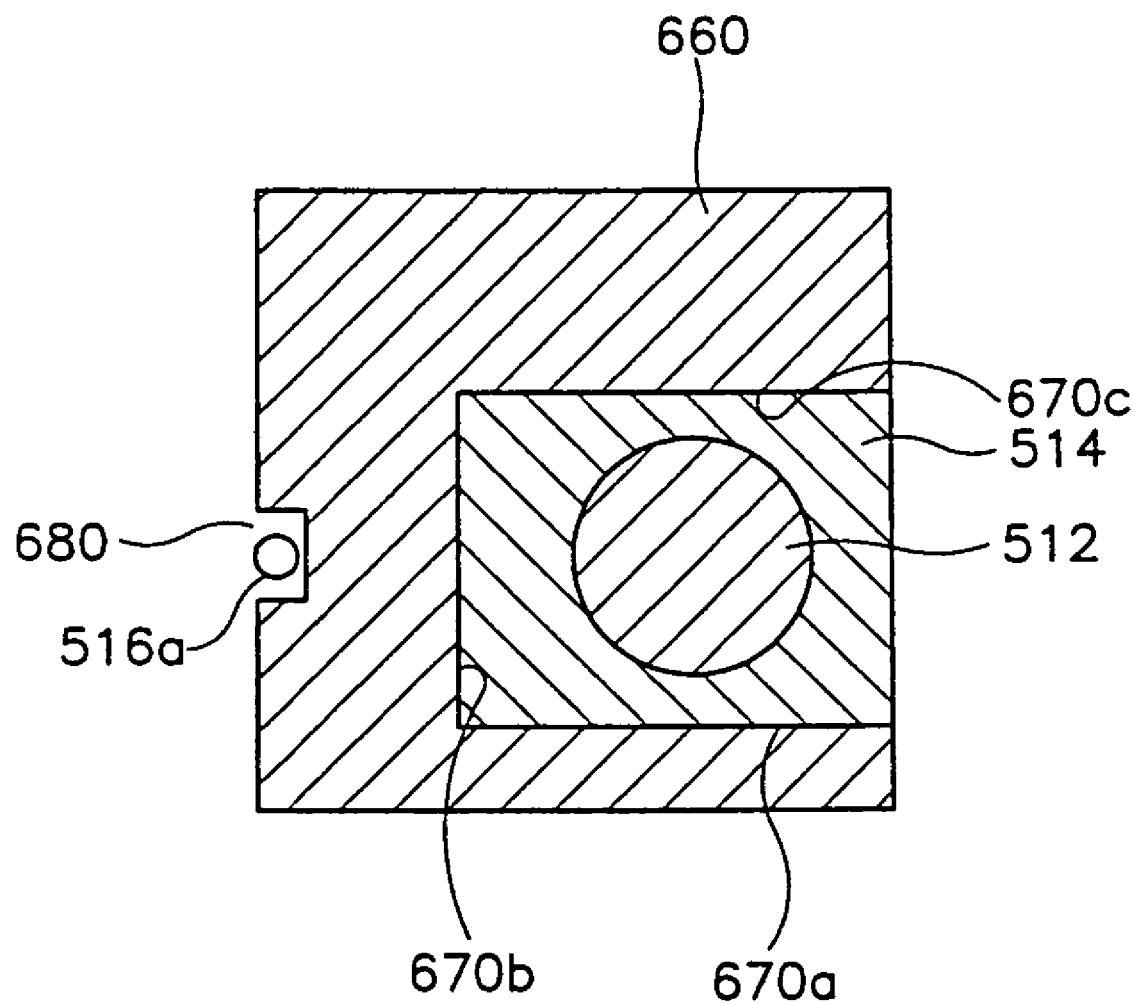
FIG. 8 is a sectional view of "$B_1$–$B_2$" portion shown in FIG. 6.

Referring to FIGS. 6, 7 and 8, the second frame 660 receiving the light source 510 has a first groove 670 receiving the lamp on a side and a second groove 680 receiving the lamp wire on the other side.

The first groove 670 of this embodiment omits the bottom portion 670a thereby reducing the weight of the second frame 660. Accordingly, as shown in FIG. 7, a first portion of the first groove 670, in which the lamp holder 514 is positioned, has substantially rectangular shape defined by the bottom portion 670a, the side portion 670b, the cover portion 670c and the other side of the first portion opposite to the side portion being open. However, as shown in FIG. 8, a second portion of the first groove 670, in which the lamp 512 is positioned, has only the side portion 670b and the cover portion 670c.

At this time, the lamp reflector 518 is attached to the side portion 670b and the cover portion 670c so that the light generated from the lamp 512 can be reflected towards the light guiding plate 520. However, since the bottom portion 670a is open, the light is not reflected in the bottom portion area. For this reason, the reflection plate 530 preferably extends up to the lower portion of the lamp 512 beyond the lower portion of the light guiding plate 520. The extended reflection plate 530 allows the light, which is radiated into the lower portion of the second frame from the lamp 512, to be reflected towards the light guiding plate 520 so that the reflecting efficiency of the light can be constantly maintained.

In the conventional liquid crystal display device, the mold frame and the lamp cover are separately manufactured though they are corresponding to each other, increasing the number of parts. However, in the liquid crystal display device of the present invention, the mold frame functions not only as a receiving container, but also as a reflector for reflecting the light generated from the lamp, reducing the number of the parts and improving the working efficiency.

The assembling of the mold frame 600 capable of dividing into several parts is as follows.

Figure 9:
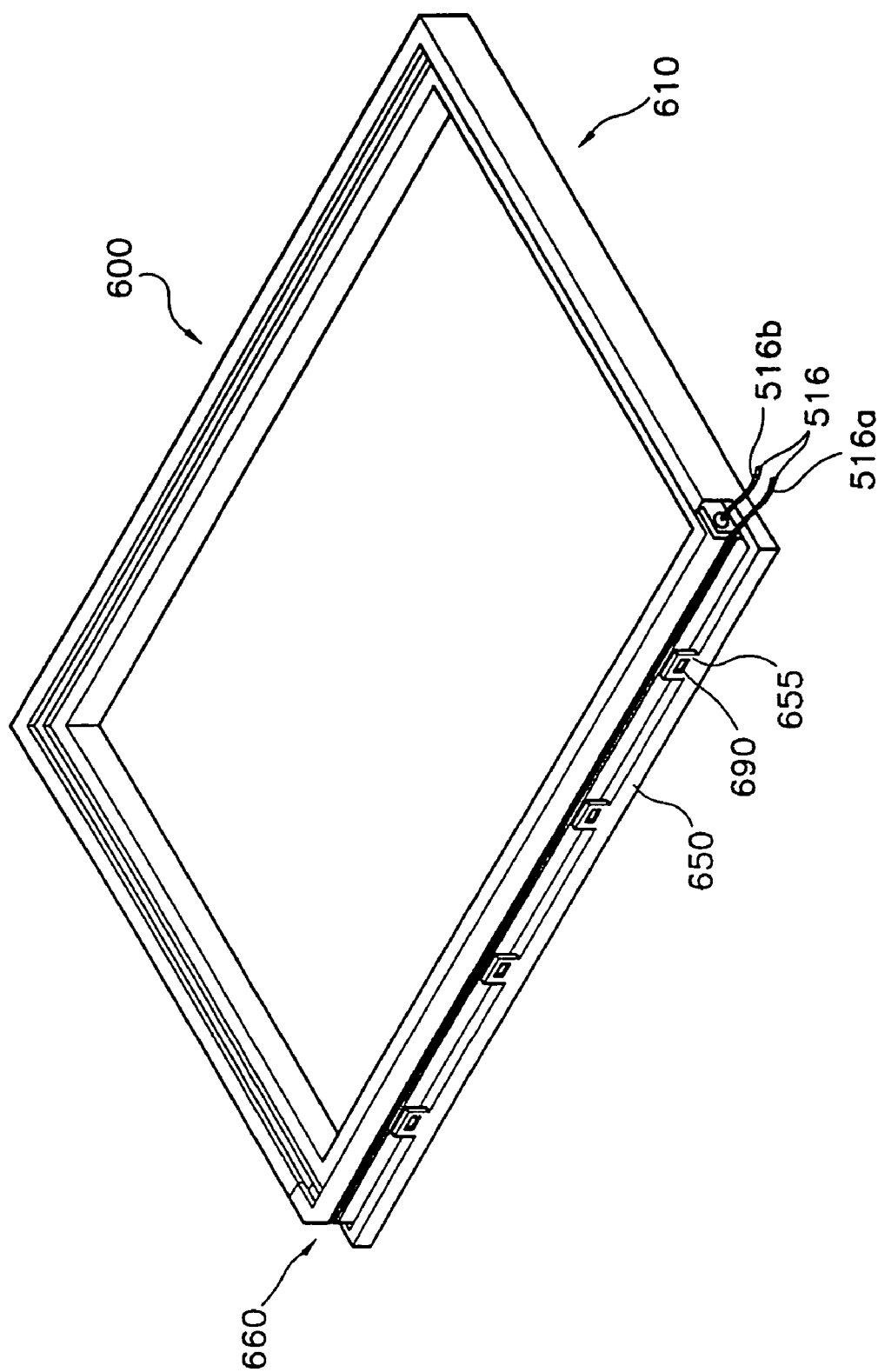
FIG. 9 is a perspective view showing a first frame assembled with a second frame.

FIG. 9 shows the first frame 610 assembled with the second frame 660.

Referring to FIG. 9, the lamp 512 and the lamp holder 514 are inserted into the first groove 670 formed in the inner portion of the second frame 660. A cold wire 516a connected to a cold electrode of the lamp 512 is received in the wire groove 680 formed in the outer portion of the second frame 660 and is connected to an inverter (not shown). On the other hand, a hot wire 516b connected to a hot electrode of the lamp 512 is connected to the inverter through the side portion of the lamp holder 514.

The coupling projections 690 formed at the outer portion of the second frame 660 are correspondingly coupled to the coupling hooks 655 integrally formed with the supporting portion 650 of the first frame 610. At this time, the stepped supporting member formed on the upper portions of the first and second side walls 620 and 630 of the first frame 610 is matched with the stepped supporting member formed on the upper surface of the second frame 660. In this manner, the mold frame 600 is assembled.

On the other hand, when exchanging the lamp 512, the second frame 660 is firstly separated from the mold frame 600 by separating the coupling hooks 655 from the coupling projections 690. Thereafter, the lamp 512 received in the first groove 670 of the second frame 660 is exchanged. Since the lamp 512 can be exchanged by simply separating the second frame 660, the light source 510 can be prevented from the external impact while the lamp 512 is being exchanged, reducing the fault of the light source 510 caused by the friction with other elements.

Though one second frame 660 is described in this application, if the light source 510 is inserted into both sides of the light guiding plate 520, two second frames 660 can be used. In this case, the first frame 610 has a pair of the side walls and a pair of supporting members. Two second frames 660 are coupled to the pair of supporting members, respectively.

As described above, according to the present invention, the mold frame is divided into several parts and the lamp reflector is attached to the groove of the divided mold frame. In addition, after receiving the light source without the lamp cover, the divided mold frames are assembled. Therefore, the mold frame functions as a container for receiving the liquid crystal display module and as the lamp cover. Accordingly, the number of the parts for the liquid crystal display device can be reduced and the manufacturing cost can be saved. In addition, the assembling steps and the repairing work of the liquid crystal display device can be simplified. Furthermore, since the lamp can be exchanged by simply separating the second frame having the light source, the fault of the light source caused by the friction with other elements can be reduced when exchanging the lamp.

Although preferred embodiments of the invention have been described, it will be understood by those skilled in the art that the present invention should not be limited to the described preferred embodiment, but various changes and modifications can be made within the spirit and scope of the invention as defined by the appended claims.

What is claimed is:

1. A liquid crystal display device, comprising:
    a display unit for displaying an image;
    a back light assembly including:
        a light source generating a light;
        a light guiding plate disposed on a side of the light source; and
        a light focusing element disposed on the light guiding plate; and
    a mold frame comprising:
        a receiving portion receiving the display unit, the light guiding plate and the light focusing element; and
        sidewalls defining the receiving portion,
    wherein the mold frame comprises a first frame and a second frame detachably coupled to the first frame, the second frame having a groove formed on a side thereof facing the light guiding plate for receiving the light source, and
    the side of the second frame having the groove formed thereon constitutes the sidewall of the mold frame.

2. The liquid crystal display device as claimed in claim 1, wherein the light source comprises:
    a lamp;
    a lamp supporting member inserted into both ends of the lamp; and
    a connecting member electrically connected to the lamp.

3. The liquid crystal display device as claimed in claim 1, further comprising a reflection plate disposed under the light guiding plate.

* * * * *